United States Patent
Van Willigenburg et al.

(10) Patent No.: US 11,560,523 B2
(45) Date of Patent: Jan. 24, 2023

(54) STAGE AND SYSTEM FOR COMPRESSING CRACKED GAS

(71) Applicant: SABIC GLOBAL TECHNOLOGIES B.V., Bergen Op Zoom (NL)

(72) Inventors: Joris Van Willigenburg, Geleen (NL); Richard Kuijpers, Geleen (NL); Henk Hendrix, Geleen (NL); Recai Artan, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 870 days.

(21) Appl. No.: 16/339,608

(22) PCT Filed: Oct. 5, 2017

(86) PCT No.: PCT/IB2017/056156
§ 371 (c)(1),
(2) Date: Apr. 4, 2019

(87) PCT Pub. No.: WO2018/065935
PCT Pub. Date: Apr. 12, 2018

(65) Prior Publication Data
US 2020/0040267 A1 Feb. 6, 2020

(30) Foreign Application Priority Data

Oct. 7, 2016 (EP) ..................... 16192720

(51) Int. Cl.
*C10G 70/04* (2006.01)
*C10G 5/06* (2006.01)
(Continued)

(52) U.S. Cl.
CPC ......... *C10G 70/043* (2013.01); *B01D 53/002* (2013.01); *C10G 5/06* (2013.01); *C10G 9/002* (2013.01)

(58) Field of Classification Search
CPC .......... C10G 5/06; C10G 9/002; C10G 70/04; C10G 70/041; C10G 70/043; B01D 53/002
See application file for complete search history.

(56) References Cited

U.S. PATENT DOCUMENTS

| | | |
|---|---|---|
| 4,143,521 A | 3/1979 | Pano et al. |
| 5,195,874 A | 3/1993 | Odagiri |
| | | (Continued) |

FOREIGN PATENT DOCUMENTS

| | | |
|---|---|---|
| CN | 101503631 | 8/2009 |
| CN | 101828029 | 9/2010 |
| | (Continued) | |

OTHER PUBLICATIONS

International Search Report and Written Opinion issued in International Patent Application No. PCT/IB2017/056156, dated Jan. 23, 2018.

(Continued)

*Primary Examiner* — Renee Robinson
(74) *Attorney, Agent, or Firm* — Norton Rose Fulbright US LLP

(57) ABSTRACT

A compression stage for the compression of cracked gas, the compression stage comprising a liquid separating means for separating liquid components from gaseous components of a cracked gas, a compressor connected to the liquid separating means, a gas cooling means connected to the compressor for cooling the compressed gas from the compressor, wherein the gas cooling means are cooled by a first cooling fluid from the cooling fluid source. The stage further comprises gas precooling means connected to the liquid separating means cracked gas, having an inlet for receiving the cracked gas.

5 Claims, 6 Drawing Sheets

(51) Int. Cl.
  *B01D 53/00*   (2006.01)
  *C10G 9/00*    (2006.01)

(56) References Cited

U.S. PATENT DOCUMENTS

| | | |
|---|---|---|
| 6,153,087 A | 11/2000 | Bigeard et al. |
| 6,270,654 B1 | 8/2001 | Colyar et al. |
| 7,214,308 B2 | 5/2007 | Colyar |
| 7,704,377 B2 | 4/2010 | Duddy et al. |
| 7,938,952 B2 | 5/2011 | Colyar et al. |
| 8,926,824 B2 | 1/2015 | Morel |
| 9,005,430 B2 | 4/2015 | Fournier et al. |
| 9,840,674 B2 | 12/2017 | Weiss et al. |
| 2003/0075485 A1 | 4/2003 | Ghijsen |
| 2004/0237581 A1 | 12/2004 | Paradowski |
| 2008/0093262 A1 | 4/2008 | Gragnani et al. |
| 2012/0172649 A1 | 7/2012 | Yadav et al. |
| 2014/0299515 A1 | 10/2014 | Weiss et al. |
| 2016/0122666 A1 | 5/2016 | Weiss et al. |

FOREIGN PATENT DOCUMENTS

| | | |
|---|---|---|
| EP | 0509592 | 10/1992 |
| JP | S6169889 | 4/1986 |
| JP | 4875484 | 7/2008 |
| WO | WO 2016/146326 | 9/2016 |
| WO | WO 2017/072632 | 5/2017 |

OTHER PUBLICATIONS

European Search Report issued in corresponding European Patent Application No. 16192720, dated Mar. 20, 2017.
Zimmerman & Walzl, "Ethylene" *Ullmann's Encyclopedia of Industrial Chemistry*, 2012, vol. 13, pp. 465-529.
Office Action issued in corresponding Iranian Patent Application No. 139850140003000063, dated Sep. 18, 2019.
Search Report and Written Opinion issued in corresponding Singaporean Patent Application No. 11201902471T, dated May 16, 2020. (8 pages).
Office Action issued in Corresponding Japanese Application No. 2019-518422, dated Oct. 5, 2021 (English Translation provided).

STAGE AND SYSTEM FOR COMPRESSING CRACKED GAS

CROSS-REFERENCE TO RELATED APPLICATIONS

This application is a national phase under 35 U.S.C. § 371 of International Application No. PCT/IB32017/056156, filed Oct. 5, 2017, which claims the benefit of priority of European Patent Application No. 16192720.7 filed Oct. 7, 2016, the entire contents of each of which are hereby incorporated by reference in their entirety.

FIELD OF THE INVENTION

The invention relates to a method and a system for compressing cracked gas from a cracking process.

BACKGROUND

In the production of crude oil products, the hydrocarbon feedstock can be cracked in a cracking process, involving short duration of vaporized hydrocarbon feedstock to high temperatures to form cracked hydrocarbon components having carbon chains with reduced length. The result is a cracked gas with such components at a high temperature.

After cooling and purification of the cracked gas in a primary fractionator and/or in the quench tower of a hydrocarbon feedstock cracking process, further processing requires compression to high pressures in the order of 3200-3800 kPa to separate the different hydrocarbon fractions from the cracked gas.

Compression is typically performed by a turbine-driven centrifugal compressor in four to five stages with intermediate cooling. Some condensation of water and hydrocarbons occurs during compression, and in the later stages, acidic gases are removed. The compressed cracked gas is cooled and condensed hydrocarbon fractions can be separated from the cracked gas stream. The compression can be performed in a multistage compressor system, wherein the number of stages depends primarily on the cracked-gas composition the temperature level of the cooling medium, and the highest temperature allowed for inter stage discharge. The compressor is usually driven by a single drive comprising a turbine or equivalent drive.

The compression of cracked gas is energy intensive. The compressor and the turbine driving the compressor are expensive equipment and present bottlenecks in many steam cracker plants.

SUMMARY

It is therefore an object of the invention to provide a compression stage for a cracked gas compression system with increased efficiency.

The object is achieved in a compression stage for the compression of cracked gas, the compression stage comprising a liquid separating means or a liquid separator for separating liquid components from gaseous components of a cracked gas, a compressor connected to the liquid separating means or the liquid separator, a gas cooling means or a as cooler connected to the compressor for cooling the compressed gas from the compressor, wherein the gas cooling means or gas cooler are cooled by a first cooling fluid from the cooling fluid source.

The stage further comprises gas precooling means or a gas precooler connected to the liquid separating means or the liquid separator cracked gas, having an inlet for receiving the cracked gas.

The precooling of the cracked gas prior to the compression by the compressor, allows the compressor work to be reduced to obtain the required pressure at a lower temperature and consequently a lower volume. Thus the fluid-gas separation is performed with the same results as in the prior art however with lower cost. As a consequence, the compressor can be chosen with lower performance, i.e. smaller than in designs known in the art.

In an embodiment the gas precooling means or gas precooler comprises a heat exchanging means or a heat exchanger and an absorption cooling means or an absorption cooler, wherein the heat exchanging means or heat exchanger is cooled by a second cooling fluid from the absorption cooling means or the absorption chiller. The absorption cooling means or the absorption chiller is arranged for generating the second cooling fluid using first cooling fluid from the cooling fluid source and hot water from a heating fluid source.

The absorption cooling means allows the generation of the second cooling fluid using cooling source which is already available for example cooling the compressed gas in the gas cooling means or gas cooler after compression and using heating fluid which is readily available in cracking processes which would normally be disposed of.

In an embodiment, the first cooling fluid for the absorption cooling means or absorption chiller is supplied from a primary gas cooler of the gas cooling means of the stage, wherein the first cooling fluid from the absorption cooling means or absorption chiller is supplied to the secondary gas cooler.

This allows a more efficient use of the first cooling fluid from the first cooling fluid source, which is employed in the gas cooling means or gas cooler.

In an alternative embodiment, the first cooling fluid for the absorption cooling means or absorption chiller of the stage is supplied from a primary gas cooler of the gas cooling means or gas cooler of another stage, wherein the first cooling fluid from the absorption cooling means or absorption chiller is supplied to the secondary gas cooler of the other stage.

The first cooling fluid can be obtained from the gas cooling means or gas cooler for more efficient use from any stage in the compression of the cracked gas.

In an embodiment, the heating fluid from the heating fluid source for the absorption cooling means or absorption chiller, has a temperature in a range of 70-110° C. This temperature range is to produce sufficient vapor to operate the absorption cooling means or absorption chiller, i.e. generator. Below 70° C. the absorption cooling means or absorption chiller does not work, whereas at temperatures above 110° C., the heat is used inefficiently, because the temperature of the heat source is higher than required.

In a further embodiment, the heating fluid has a temperature in the range of 70-95° C. This allows the most efficient operation of the absorption cooling means or absorption chiller.

In another embodiment, the heating fluid source comprises a hot waste water source.

In a further embodiment, the heating fluid source comprises a quench column of a steam cracker.

Heat from quench water from the quench column of a steam cracker unit would normally be disposed of by cooling, or be used for reboiling in distillation columns, however it can be put into efficient use in the compression stages according to the invention, to reduce the workload of compressors in the compression stage according to the invention.

In an embodiment, the heat exchanging means or heat exchanger of the gas precooling means or gas precooler comprises a chiller.

In an embodiment, the liquid separating means or liquid separator has a fluid inlet for receiving fluid from another compression stage.

This allows liquid components from later compression stages to be recycled to obtain increased separation between gaseous components and liquid components from the cracked gas.

The object is also achieved in a system for cracked gas compression, comprising a plurality of cascaded compression stages as described above, wherein a first compression stage has its gas precooling means or gas precooler connected to a cracked gas source, and wherein a subsequent compression stage has its gas precooling means or gas precooler connected to the gas cooling means or gas cooler of its preceding compression stage.

The compression stages according to the inventions can be cascaded. Using the precooling, the overall workload for compressors in the system can be reduced.

In an embodiment, the compressor in each stage is driven by a common compressor drive.

The compressors can be advantageously driven by a common drive on a common shaft, driven by a turbine engine, diesel motor or an electric motor and the like.

The object is also achieved in a process for compressing a cracked gas, the process comprising separating liquid components from gaseous components of a cracked gas in a liquid separating means or liquid separator, compressing the gaseous components from the liquid separating means liquid separator in a compressor, cooling the compressed gaseous components in gas cooling means or gas cooler. The process further comprises precooling the cracked gas prior to separating liquid components from gaseous components of a cracked gas in a liquid separating means or liquid separator in an gas precooling means or gas precooler, cooling the gas precooling means or gas precooler by a second cooling fluid from an absorption cooling means or absorption chiller using first cooling fluid from the cooling fluid source and hot water from a heating fluid source.

In an embodiment, the gas precooling means comprises a heat exchanging means or heat exchanger and an absorption cooling means or absorption chiller, the process further comprising cooling the heat exchanging means or heat exchanger by a second cooling fluid from the absorption cooling means or absorption chiller, generating the second cooling fluid in the absorption cooling means absorption chiller using first cooling fluid from the cooling fluid source and hot water from a heating fluid source.

The following includes definitions of various terms and phrases used throughout this specification.

The terms "about" or "approximately" are defined as being close to as understood by one of ordinary skill in the art. In one non-limiting embodiment, the terms are defined to be within 10%, preferably, within 5%, more preferably, within 1%, and most preferably, within 0.5%.

The terms "wt. %", "vol. %", or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "effective," as that term is used in the specification and/or claims, means adequate to accomplish a desired, expected, or intended result.

The use of the words "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, steps etc., disclosed throughout the specification. It is also to be understood that a description on a product/composition/process/system comprising certain components also discloses a product/composition/system consisting of these components. The product/composition/process/system consisting of these components may be advantageous e.g., in that it offers a simpler, more economical process for the preparation of the product/composition. Similarly, it is also to be understood that, for example, a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

In the context of the present invention, 14 Embodiments are now described. Embodiment 1 is a compression stage for the compression of cracked gas, the compression stage including a liquid separating means or liquid separator for separating liquid components from gaseous components of a cracked gas; a compressor connected to the liquid separating means or liquid separator; a gas cooling means or gas cooler connected to the compressor for cooling the compressed gas from the compressor, wherein the gas cooling means or gas cooler are cooled by a first cooling fluid from the cooling fluid source; the stage further including gas precooling means connected to the liquid separating means, having an inlet for receiving the cracked gas. Embodiment 2 is the stage according to embodiment 1, wherein the gas precooling means or gas precooler comprises a heat exchanging means or heat exchanger and an absorption cooling means or absorption chiller, wherein the heat exchanging means or heat exchanger is cooled by a second cooling fluid from the absorption cooling means or absorption chiller, wherein the absorption cooling means or absorption cooler is arranged for generating the second cooling fluid using first cooling fluid from the cooling fluid source and hot water from a heating fluid source. Embodiment 3 is the stage according to embodiments 1 or 2, wherein the first cooling fluid for the absorption cooling means or absorption chiller is supplied from a primary gas cooler of the gas cooling means or gas cooler of the stage, and wherein the first cooling fluid from the absorption cooling means or absorption chiller is supplied to the secondary gas cooler. Embodiment 4 is the stage according to embodiments 1 or claim 2, wherein the first cooling fluid for the absorption cooling means or absorption chiller of the stage is supplied from a primary gas cooler of the gas cooling means or gas cooler of another stage, and wherein the first cooling fluid from the absorption cooling means or absorption chiller is supplied to the secondary gas cooler of the other stage. Embodiment 5 is the stage according to any of embodiments 1 to 4, wherein the heating fluid from the heating fluid source for the absorption cooling means or absorption chiller, has a temperature in a range of 70-110° C. Embodiment 6 is the stage according to embodiment 5, wherein the heating fluid has a temperature in the range of 70-95° C. Embodiment 7 is the stage according to any of embodiments 5 or 6, wherein the heating fluid source comprises a quench column of a steam cracker. Embodiment 8 is the stage according to embodiments 5 or 6, wherein the heating fluid source is a hot waste water source. Embodiment 9 is the stage according to any of embodiments 1 to 8, wherein the heat exchanging means or heat exchanger of the gas precooling means or gas precooler comprises a chiller. Embodiment 10 is the stage according to any of embodiments 1 to 9, wherein the liquid separating means or liquid separator has a fluid inlet for receiving fluid from another compression stage.

Embodiment 11 is a system for cracked gas compression, including a plurality of cascaded compression stages in accordance with any one of Embodiments 1 to 10, wherein a first compression stage has its gas precooling means or gas precooler connected to a cracked gas source, and wherein a subsequent compression stage has its gas precooling means or gas precooler connected to the gas cooling means or gas precooler of its preceding compression stage. Embodiment 12 is the system according to embodiment 11, wherein the compressor in each stage is driven by a common compressor drive.

Embodiment 13 provides a process for compressing a cracked gas, the process including the steps of separating liquid components from gaseous components of a cracked gas in a liquid separating means or liquid separator; compressing the gaseous components from the liquid separating means or liquid separator in a compressor; cooling the compressed gaseous components in gas cooling means or gas cooler, the primary gas cooler;
the process further comprising precooling the cracked gas prior to separating liquid components from gaseous components of a cracked gas in a liquid separating means or liquid separator in an gas precooling means or gas precooler; and cooling the gas precooling means by a second cooling fluid from an absorption cooling means using first cooling fluid from the cooling fluid source and hot water from a heating fluid source. Embodiment 14 is the process according to embodiment 13, wherein the gas precooling means or gas precooler comprises a heat exchanging means or heat exchanger and an absorption cooling means or absorption chiller, the process further comprising cooling the heat exchanging means or heat exchanger by a second cooling fluid from the absorption cooling means or absorption chiller; generating the second cooling fluid in the absorption cooling means or absorption chiller using first cooling fluid from the cooling fluid source and hot water from a heating fluid source.

Other objects, features and advantages of the present invention will become apparent from the following figures, detailed description, and examples. It is noted that the invention relates to all possible combinations of features described herein, preferred in particular are those combinations of features that are present in the claims. It will therefore be appreciated that all combinations of features relating to the composition, process, system according to the invention; all combinations of features relating to the process according to the invention and all combinations of features relating to the system according to the invention and features relating to the process according to the invention are described herein. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF EMBODIMENTS

Figure 1A:
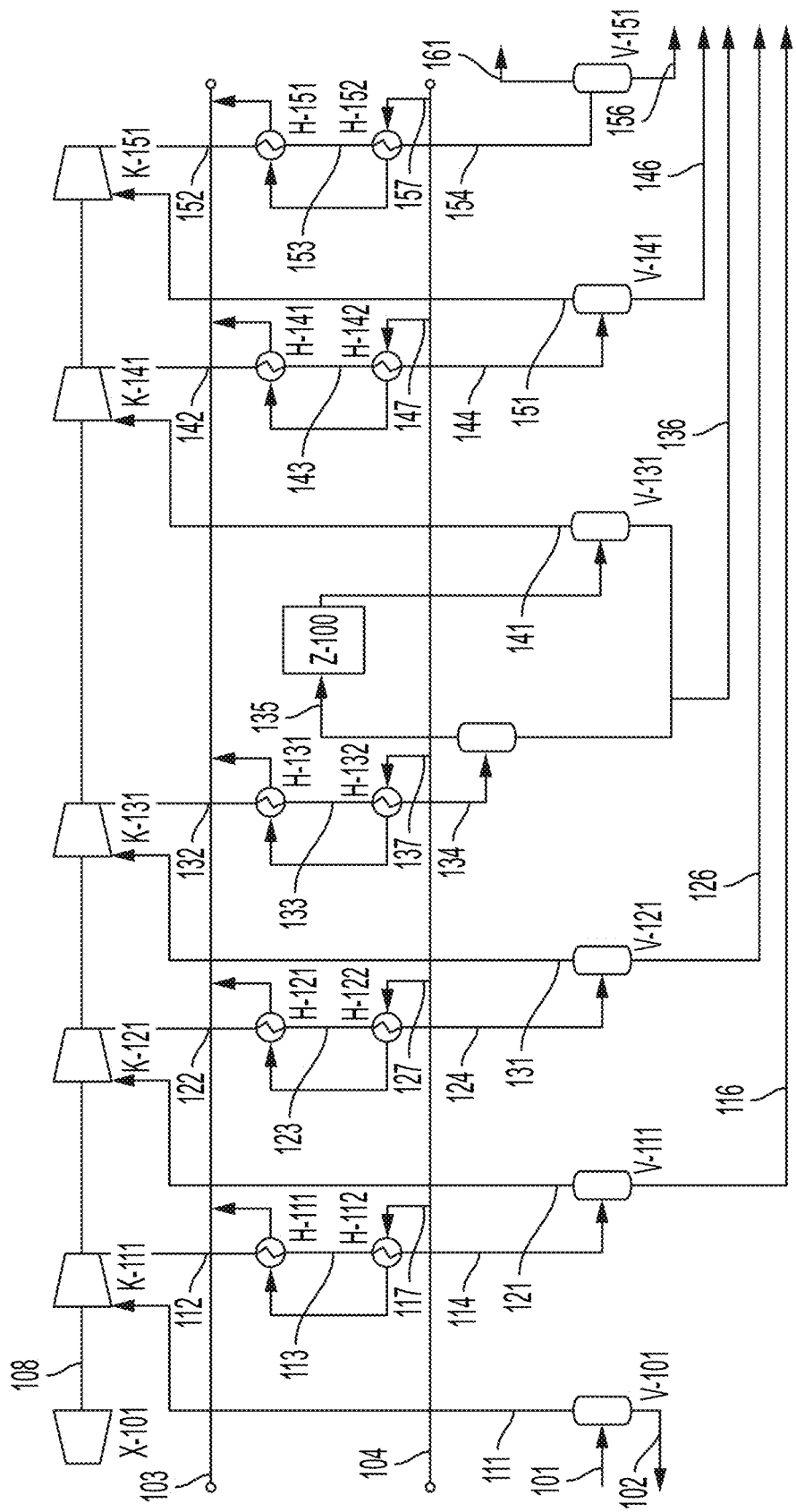
FIG. 1a shows a schematic diagram of a compressor system having compressor stages according to the state of the art.

As described in the prior art, many configurations are possible from three to five compressor stages with inter stage coolers in between. A configuration according to the prior art having five stages is shown in FIG. 1a. Each compressor stage comprises a quench column V-101, V-111, V-121, V-131, V-141 for liquid-gas separation, a compressor K-111, K-121, K-131, K-141, K-151 and an inter stage cooler H-111/112, H-121/122, H-131/132, H-141/142, H-151/151. After the inter stage coolers the water and hydrocarbon condensates can be routed 102, 116, 126, 136, 146, 156 for further processing for example to a fractionating tower, or to another compressor stage, to the quench column preceding the compressor. In liquid cracking most of the gasoline fraction containing the C6 to C8 aromatics is condensed in the inter stage coolers of the compressor also many of the C4 and C5 components. The compressors K-111-K-151 in this example are driven by a common turbine engine X-101 via a common shaft 208.

Figure 1B:
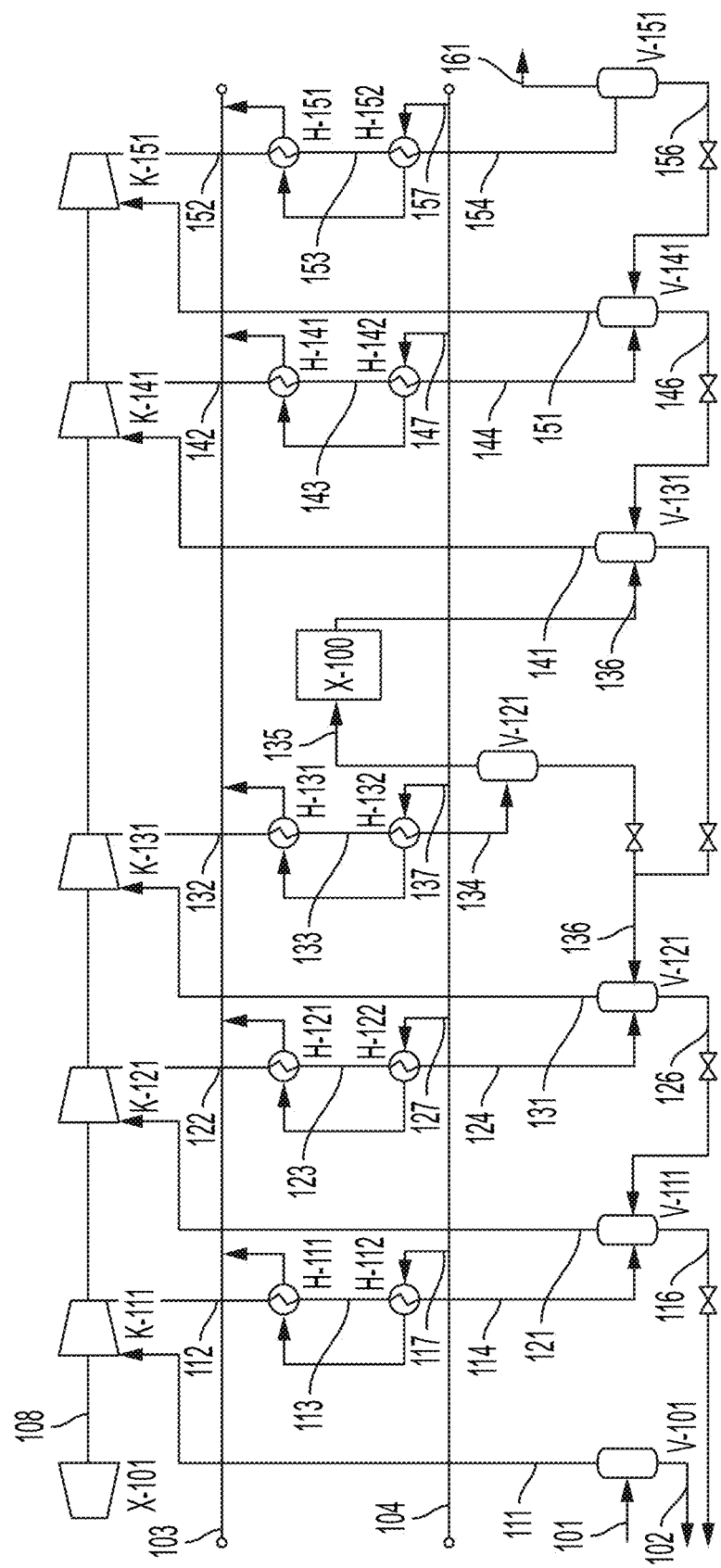
FIG. 1b shows a schematic diagram of a compressor system having compressor stages according to the state of the art.

In FIG. 1b another configuration known in the state of the art is shown similar to the configuration of FIG. 1b with rerouting of condensed water and hydrocarbons to a preceding stage, wherein the quench columns V-111-V-141 have an inlet for receiving the liquid components from the succeeding stage.

Two computer simulations have been performed for a cracked gas compressor of five stages in accordance with FIGS. 1a and 1b respectively of compressing a cracked gas containing 100 t/h of ethylene originating from naphtha cracked with a mild cracking severity (propylene/ethylene ratio of 0.58). Inter stage cooler outlets 114-154 temperatures are kept at 30° C. Each compressor K-111-K-151 has an isentropic efficiency of 80%.

Cracked gas (101) from the quench tower is sent to suction drum vessel (V-101), any condensates (102) are pumped back to the quench tower, while the cracked gas (1×1) is sent to the inlet of the ($1^{st}$, $2^{nd}$, $3^{rd}$, $4^{th}$, $5^{th}$) compressor stage (K-1×1) at an absolute pressure of 0.15 $MPa_a$. The outlet from compressors K-1×1 is cooled against cooling water from cooling water source 104 by heat exchangers (H-101 and H-1×2) to a temperature of 30° C., in suction drum vessel V-111, V-121, V-131, V-141 and V-151 the condensed hydrocarbons and water 106, 116, 126, 136, 146, 156 are separated from the cracked gas 101, 111, 121, 131, 141, 151, respectively.

Between the $3^{rd}$ and $4^{th}$ compressor stage a gas treatment in a gas treatment unit Z-100 is performed as described in the prior art. In the gas treatment unit Z-100 the gas is purified by removing gasses such as carbon dioxide, dihydrogen sulphide, acid components, etc. The cracked gas is compressed to 3.6 $Mpa_a$ (stream 161) and the calculated compressor power in 36.2 $MW_{mech}$. In the scheme of FIG. 1a the condensed streams (116, 126, 136, 146, 156) are not recycled (directly) back to the compressor but are treated in a fractionating tower, flash separation and or decanter to recover the products and might be pumped, heated and or cooled to desired pressure and temperature for further treatment.

In the scheme of FIG. 1b, the condensed streams 116, 126, 136, 146, 156 are not separately treated but recycled back to the previous stage: 116 back to the quench tower or first stage suction drum (V-101). Stream 126 to V-111, stream 136 to V-121, stream 146 to V-132 and stream 156 to V-141, as visualized in FIG. 1b. For this scheme the total compressor power was calculated to be 39.5 $MW_{mech}$.

Figure 2A:
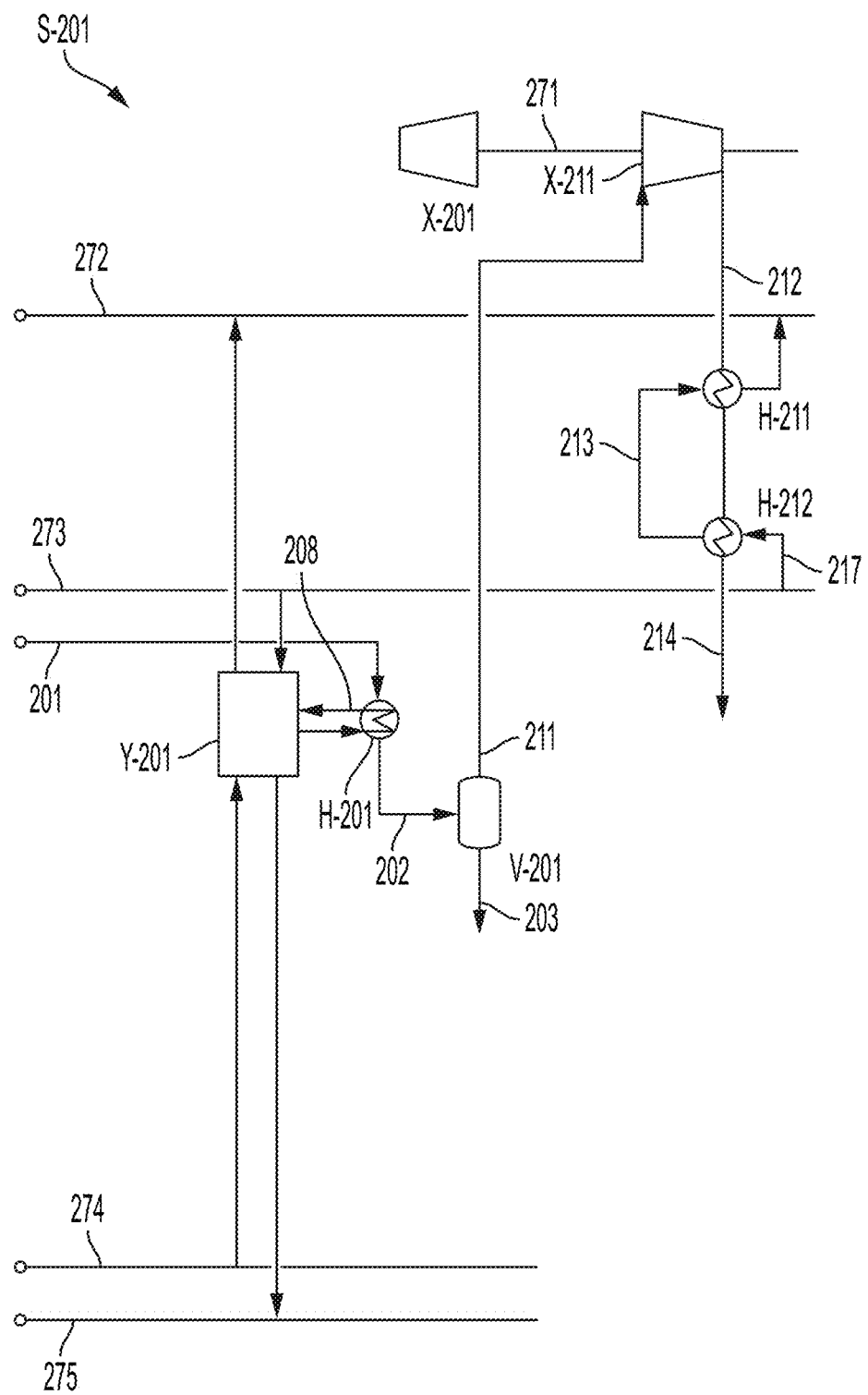
FIG. 2a shows a compressor stage according to an embodiment of the invention.

In FIG. 2a a compressor stage S-201 is shown comprising a suction drum V-201, a compressor K-211 driven by turbine engine X-201 via shaft 271, an interstage cooler H-211/H-212, and a pre-cooler H-201. The outlet 214 of the inter stage cooler H-211/H-212 can be connected to a subsequent compressor stage (S-201, see for example FIG. 2c).

Cracked gas in inlet 201 is precooled in pre-cooler H-201 to 15° C. (range could be 1-25° C.) and sent to suction drum V-201 for separating liquid and gas components. Cooler H-201 transfers the heat from the cracked gas in a chilled water loop (208), that is cooled by absorption chiller Y-201. The absorption chiller uses heat from quench water source 274 by cooling it down from 80° C. to 73° C. and returning it to the warm quench water header 275. The absorption chiller Y-201 transfers the heat from the quench water and the chilled water loop to cooling water, from cooling water source 273 at 25° C. to cooling water header 272 at 35° C.

In suction drum V-201 condensed water and hydrocarbons are separated out 203, pumped and heated to separate it in a gas stream 204 to be sent back to the quench tower and a liquid stream 205 of which the hydrocarbons can be separated from the water in a decanter (not shown in FIG. 2a).

Quench water from the quench tower in the quench water source 274 is typically around 85-75° C. in temperature, but the use of this in the steam cracker is limited to some reboilers in distillation columns, where a reboiler for the C3 olefins/paraffin separation is the major consumer. A large amount of the quench water cannot be used and heat has to be disposed of by cooling to the air and cooling water. Thus quench water can be advantageously used to operate the absorption chiller Y-201. The operation of an absorption chiller will be elucidated in FIG. 3 and the corresponding description.

Figure 2B:
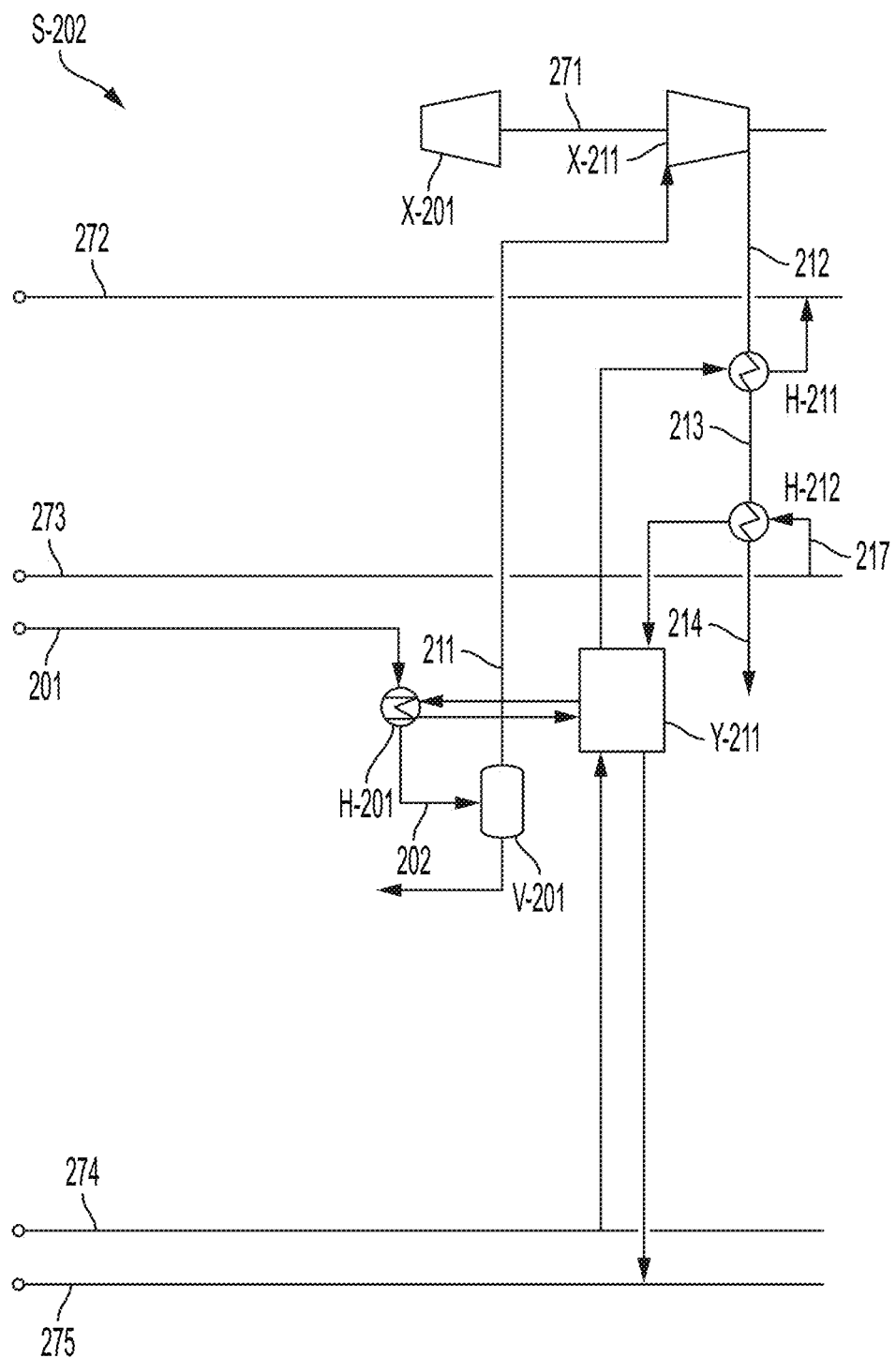
FIG. 2b shows a compressor stage according to an embodiment of the invention.

The cold water source in FIG. 2b for the chiller 201 is the absorption chiller Y-211 which is cooled by cooling water from the primary cooler H-212. The cooling water from the absorption chiller Y-211 is subsequently supplied to the secondary cooler H-211. Thus the cooling water from cooling water source 273 is used more efficiently.

Figure 2C:
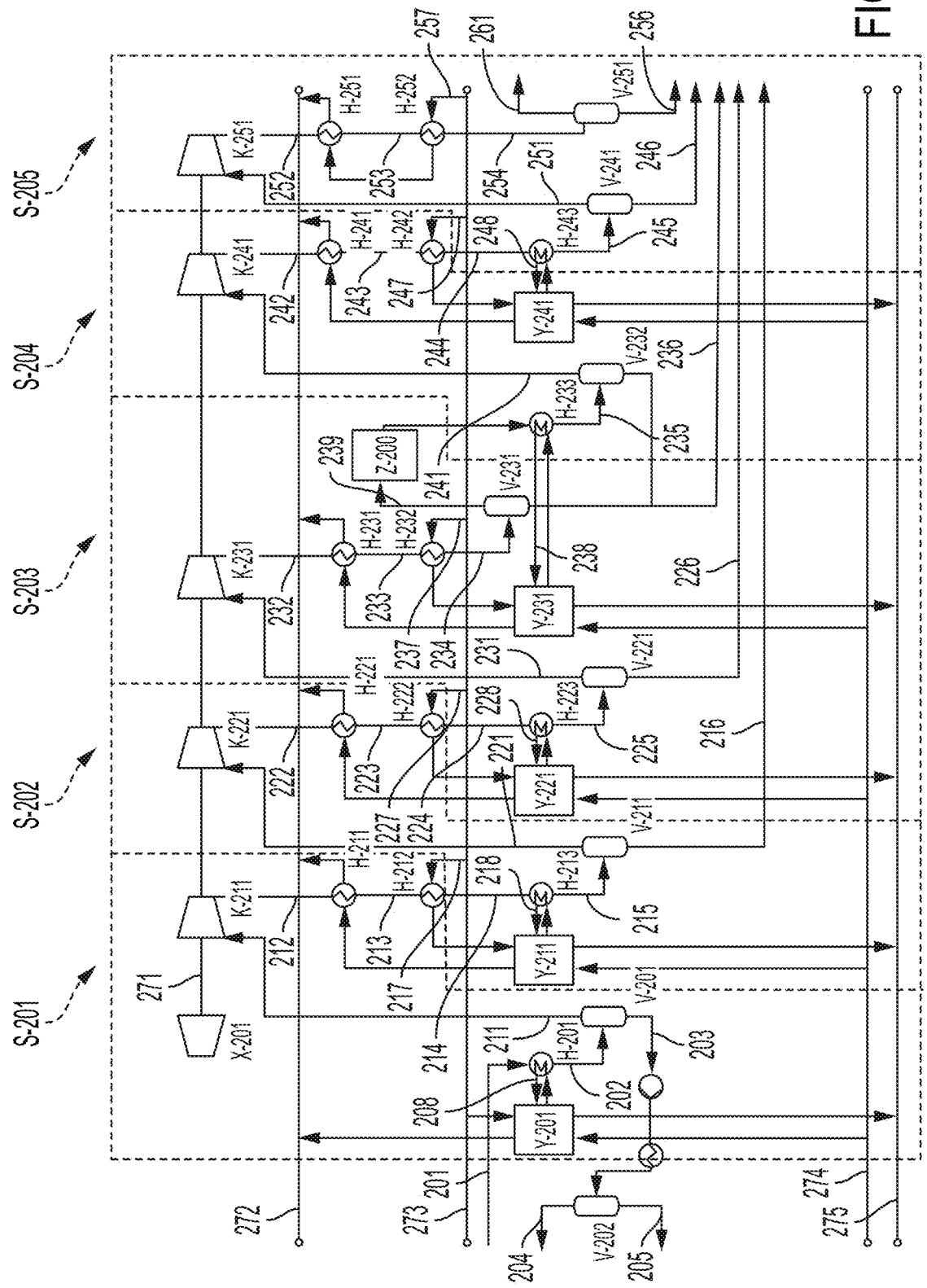
FIG. 2c shows a schematic diagram of a compressor system having compressor stages according to an embodiment of the invention.

In FIG. 2c both configurations for using cooling water from the chiller 201 in the first stage according to FIGS. 1a and 1b respectively are shown. Chiller 201 of stage S-201 receives cooling fluid from absorption chiller Y-201 which is cooled directly with cooling water from cooling water source 273, whereas chiller H-213 of stage S-202 receives its cooling fluid from absorption chiller Y-211, which it cooled by cooling fluid from the primary gas cooler H-212 of stage S-201.

In FIG. 2c further compressor stages S-203-S-205 are shown in a cascade of compressor stages. Compressor stage S-203 is provided with a gas treatment unit Z-200 with the same function as in the configuration in FIGS. 1a and 1b.

In FIG. 2c, the vapor from suction drum V-201 (211) is sent to the first compressor stage S-201 and compressed by the compressor K-211 to 0.3 $MPa_a$ (212) where it is cooled by H-211 and H-212 to a temperature in a range of 20-50° C., preferably around temperature of 30° C., and further cooled by H-213 to temperature in a range of range 1-25° C., preferably around 15° C., and supplied to suction drum V-211 of the second stage S-202 via chiller H-213 where it is pre-cooled for stage S-202.

In suction drum V-211 of stage S-202 condensed water and hydrocarbons are separated out 216 of which the hydrocarbons can be separated from the water in a decanter. The vapor from suction drum V-211 is supplied to the compressor K-221, from where it is cooled by gas coolers H-221, H-222.

Cooler H-213 transfers the heat from the cracked gas in a chilled water loop 218, that is cooled by absorption chiller Y-211. The absorption chiller Y-211 uses heat from quench water source 274 by cooling it down from 80° C. to 73° C. and returning it to the warm quench water header 275. Heat from H-211, H-212 and Y-211 is transferred to a cascade of cooling water 217 that is first heated by H-212, then by Y-211 and then by H-211.

Above sequence is repeated in stages S-203 and S-205. The vapor from stage S-202 is precooled in chiller H-223, supplied to suction drum V-221 from where it is supplied to the compressor stage K-231 and compressed to 3 bara (232) where it is cooled by H-231 and H-232 to a temperature of 30° C. (range 20-50° C.). etc.

In between stages S-203 and S-204 a gas treatment unit Z-200 as described is included. In this case H-233 is located downstream of this gas purification step. Additional hydrocarbon containing streams can be added to suction vessels V-202, V-201, V-211, V-221, V-232, V-241, V-251 but are not shown.

Compared to the system as described in FIG. 1a, the compressor work is strongly reduced, the total compressor work is reduced from 36.2 $MW_{mech}$ to 33.5 $MW_{mech}$. In Table 1 the results per compressor stage are provided.

TABLE 1

| Method 100 (See FIG. 1a according to the prior art) | | Method 200 (see FIG. 2c according to the invention) | |
| --- | --- | --- | --- |
| Compressor | Work ($MW_{mech}$) | Compressor | Work ($MW_{mech}$) |
| K-111 | 7.8 | K-211 | 5.9 |
| K-121 | 7.7 | K-221 | 6.4 |
| K-131 | 7.4 | K-231 | 6.8 |
| K-141 | 7.0 | K-241 | 7.1 |
| K-151 | 6.4 | K-251 | 7.4 |
| total | 36.2 | | 33.5 |

From the comparative example in table 1 it is clear that using precooling of the cracked gas prior to compression saves approximately 3 MW mechanical power.

Another important effect of stage inlet cooling with an absorption chiller are the compressor stage outlet temperatures, which in this example of FIG. 2c is in a range of 9 to 17° C. lower than in FIG. 1a. This reduces the fouling in the compressor and inter stage coolers. Moreover, this enables a less expensive compressor design with fewer compressor stages.

In table 2 inlet and outlet temperatures are shown of the compressors K-111, K-121, K-131, K-141, K-151 in FIG. 1a and compressors K-211, K-221, K-231, K-241, K-251 in FIG. 2c.

TABLE 2

| | Work Method 100 (see FIG. 1a state of the art) | | | Work Method 200 (See FIG. 2c according to the invention) | |
| --- | --- | --- | --- | --- | --- |
| Compressor | Inlet temperature ° C. | Outlet temperature ° C. | Compressor | Inlet temperature ° C. | Outlet temperature ° C. |
| K-111 | 30 | 74 | K-211 | 15 | 65 |
| K-121 | 34 | 79 | K-221 | 19 | 64 |
| K-131 | 34 | 81 | K-231 | 17 | 64 |
| K-141 | 32 | 81 | K-241 | 16 | 65 |
| K-151 | 31 | 83 | K-251 | 16 | 67 |

The quench water usage of Y-241 amounts to: 672 t/h. Hot quench water from header 274 is fed to absorption chiller Y-241 at 80° C. and after taking 6.3 $MW_{th}$ of heat it is returned at 73° C. as warm quench water to header 275. This warm quench water, can still be used, for example as reboiler heat (H-261) in a C3 fractionating tower. This cascade of quench water allows optimal use of the available heat transferred from the quench tower. The same principles and amounts apply to absorption chillers Y-201, Y-211, Y-221, Y-231.

Regarding the cascaded cooling water streams 217, 227, 237 and 247, an example is provided for 247 in accordance with FIG. 2c. Cooling water is supplied first to the secondary cracked gas cooler H-242, than to absorption chiller Y-241, then to first cracked gas cooler H-241. This saves cooling water. Example: 1400 t/h cooling water (247) at 25° C. from cooling water source 273 is fed to second $4^{th}$ stage inter stage cooler H-242, where it absorbs 1.9 $MW_{th}$ of heat and exits at a temperature of 26.2° C. Next the cooling water is used in the absorption chiller to absorb 10.6 $MW_{th}$ of transferred heat from the chiller (heat from quench water+ heat removed from the process) and as a result is heated to 32.8° C. Then the cooling water is routed to primary $4^{th}$ stage inter stage cooler H-241, where it absorbs 3.5 $MW_{th}$ of heat and is heated to 35° C.

The scheme as described in FIG. 1b with full recycles can also apply to FIG. 2c. The difference compared to FIG. 2c is that product streams 216, 226, 236, 246 and 256 are not separate products, but are recycled back to the respective previous compressor stage suction drum.

In table 3 the compressor work is shown of the system according to FIG. 1b according to the state of the art, compared to the system of FIG. 2c wherein the product streams 216, 226, 236, 246 and 256 are recycled.

TABLE 3

| Method 100 (See FIG. 1b according to the prior art) | | Method 200 (see FIG. 2c according to the invention) | |
| --- | --- | --- | --- |
| Compressor | Work ($MW_{mech}$) | Compressor | Work ($MW_{mech}$) |
| K-111 | 7.8 | K-211 | 5.9 |
| K-121 | 7.7 | K-221 | 6.4 |
| K-131 | 7.4 | K-231 | 6.8 |
| K-141 | 7.0 | K-241 | 7.1 |
| K-151 | 6.4 | K-251 | 7.4 |
| total | 36.2 | | 33.5 |

From the comparative example in table 3 it is clear that using precooling of the cracked gas prior to compression saves approximately 3 MW mechanical power, also when the intermediate product streams 216, 226, 236, 246 and 256 are recycled in a previous stage.

Figure 3:
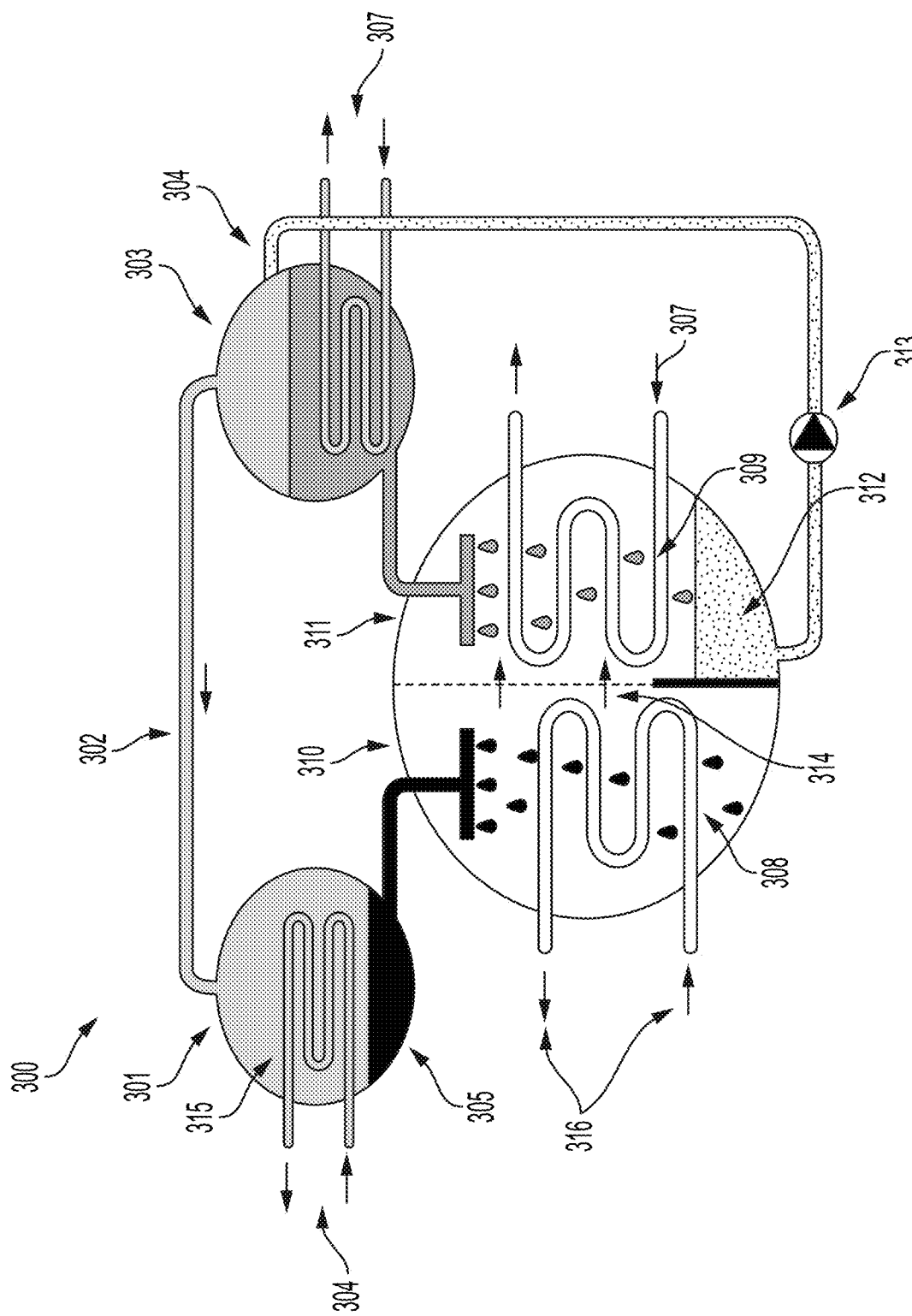
FIG. 3 shows a schematic diagram of an absorption chiller according to the state of the art.

FIG. 3 show a schematic diagram of an absorption chiller 300 as used in the compression stages S-201-S-205 is explained below.

The absorption cooling cycle in an absorption chiller, like the mechanical vapor compression refrigeration cycle, utilizes the latent heat of evaporation of a refrigerant to remove heat from the entering chilled water. Vapor compression refrigeration systems use a refrigerant and a compressor to transport the refrigerant vapor to be condensed in the condenser. The absorption cycle, however, uses water as the refrigerant 305 and an absorbent lithium bromide solution as absorbent 306 to absorb the vaporized refrigerant. Heat is then applied to the solution to release the refrigerant vapor from the absorbent. The refrigerant vapor is then condensed in the condenser.

The basic single-effect absorption chiller 300 of FIG. 3 includes a generator 303, condenser 301, evaporator 310 and absorber 311 with refrigerant 305 and absorbent 306 as the working solutions. The generator 303 utilizes a heat source, for example a fluid 307 such as hot gas from a burner, steam or hot water to evaporate the refrigerant 302 from the absorbent solution 306 in the generator 303. The refrigerant vapor 302 that is released travels to the condenser 301 where it is condensed back into liquid refrigerant 305, transferring the heat to the cooling tower water 304 in heat exchanger 315. Once condensed, the liquid refrigerant 305 is sent to evaporator 310 where it is distributed over the evaporator tubes 308, removing the heat from the chilled water 316 in the evaporator tubes 308 and vaporizing the liquid refrigerant 305 into refrigerant vapor 314.

The absorbent solution 306 from the generator 303 passes into the absorber 311 via cooling tubes 309, while absorbing the refrigerant vapor 314 from the evaporator 310 and dilutes itself. The diluted absorbent solution 312 is then pumped back via pump 313 to the generator 305 where the cycle is started again.

The absorption chiller 300 has the capability to consume the low temperature heat released from condensing the water/steam from the reactor effluent and provide cooling duty in the temperature range of 0-30° C.

The absorption chiller process is not a very energy efficient process, typically only 70% of the thermal heat input is converted to thermal cooling duty. However, because of the process can utilize low temperature waste heat, this is not an issue when sufficient waste heat is available.

Although lithium bromide is used as a working solution in the example other working media are also possible. Absorption chillers based on an ammonia water mixture are common as well and could be used instead of the lithium bromide absorption chiller.

In the compressor stage 201 in FIG. 2a, the heating fluid 307 for heating the generator 303 is obtained from the quench water source 274. The cooling water 304 for the condenser 301 is obtained from the cooling water source 273, or from the cooling water outlet of gas cooler H-212. The evaporator tubes 308, provide for cooling the cooling liquid 316 for the precooling chiller H-201 via loop 208 in FIG. 2a.

The embodiments described above are given by way of example only. Deviations and modifications to these embodiments are possible without departing from the scope of protection as set out in the claims below.

REFERENCE NUMERALS 101, 114, 124, 134, 144, 154 cracked gas inlet
K-111, K-121, K-131, K-141, K-151 compressor
108 common drive axle
112, 122, 132, 142, 152 compressor outlet
111, 121, 131, 141, 151 compressor inlet
117, 127, 137, 147, 157 cooling water inlet
113, 123, 133, 143, 153 interconnection
103 cooling water source
104 cooling water header
139 gas purifier inlet
H-111, H-121, H-131, H-141, H-151 primary gas cooler
H-112, H-122, H-132, H-142, H-152 secondary gas cooler
116, 126, 136, 146, 156 intermediate product streams
Z-100 gas purifier
201, 202, 215, 225, 235, 245, 254 cracked gas inlet
K-211, K-221, K-231, K-241, K-251 compressor
H-211, H-221, H-231, H-241, H-251 primary gas cooler
H-212, H-222, H-232, H-242, H-252 secondary gas cooler
Y-201, Y-211, Y-221, Y-232, Y-241 absorption chiller
V-201, V-211, V-221, V-232, V-241 liquid separator
V-202 liquid separator
H-201, H-213, H-223, H-233, H-243 precooling chiller
216, 226, 236, 246, 256 intermediate product streams
273 cooling water source
272 cooling water header
274 quench water source
275 quench water header
300 absorption chiller
301 condenser
302 refrigerant vapor
303 generator
304 condenser cooling water
305 refrigerant
306 absorbent
307 heating fluid
308 evaporator tubes
309 cooling tubes
310 evaporator
311 absorber
312 diluted absorbent
315 heat exchanger
316 chilled water

The invention claimed is:

1. A compression stage for the compression of cracked gas, the compression stage comprising:
a liquid separating means for separating liquid components from gaseous components of a cracked gas;
a compressor connected to the liquid separating means for compressing the gaseous components from the liquid separating means;
a gas cooling means connected to the compressor for cooling a compressed gas from the compressor, wherein the gas cooling means are cooled by a first cooling fluid from a cooling fluid source;
the stage further comprising gas precooling means connected to the liquid separating means for cooling the cracked gas before separation, the gas precooling means having an inlet for receiving the cracked gas, wherein the gas precooling means comprises a heat exchanging means and an absorption cooling means;
wherein the heat exchanging means is cooled by a second cooling fluid from the absorption cooling means, wherein the absorption cooling means is arranged for generating the second cooling fluid using first cooling fluid from the cooling fluid source and heating fluid from a heating fluid source;
wherein the first cooling fluid for the absorption cooling means is arranged to be supplied from a primary gas cooler of the gas cooling means of the stage, and
wherein the first cooling fluid from the absorption cooling means is arranged to be supplied to a secondary gas cooler of the gas cooling means.

2. The stage according to claim 1, wherein the heat exchanging means of the gas precooling means comprises a chiller.

3. The stage according to claim 1, wherein the heating fluid from the heating fluid source for the absorption cooling means, has a temperature in a range of 70-110° C.

4. A system for cracked gas compression, comprising a plurality of cascaded compression stages in accordance with claim 1, wherein a first compression stage has its gas precooling means connected to a cracked gas source, and wherein a subsequent compression stage has its gas precooling means connected to the gas cooling means of its preceding compression stage.

5. A system according to claim 4, wherein the compressor in each stage is driven by a common compressor drive.

* * * * *